No. 775,100. PATENTED NOV. 15, 1904.
H. J. BERKLEY.
NUT LOCK.
APPLICATION FILED JAN. 2, 1904.
NO MODEL.

Witnesses:
S. John Williamson
J. Ferdinand Vogt.

Inventor:
Henry J. Berkley
By Mann & Co,
Attorneys.

No. 775,100. Patented November 15, 1904.

UNITED STATES PATENT OFFICE.

HENRY J. BERKLEY, OF BALTIMORE, MARYLAND, ASSIGNOR OF ONE-HALF TO CHARLES F. CORNING, OF BALTIMORE, MARYLAND.

NUT-LOCK.

SPECIFICATION forming part of Letters Patent No. 775,100, dated November 15, 1904.

Application filed January 2, 1904. Serial No. 187,420. (No model.)

*To all whom it may concern:*

Be it known that I, HENRY J. BERKLEY, a citizen of the United States, residing at Baltimore, State of Maryland, have invented certain new and useful Improvements in Nut-Locks, of which the following is a specification.

This invention relates to improvements in nut-locks, and is particularly adapted for bolts used on wood structures.

The object of the present invention is to provide an improved split ring having flanges for penetrating the wood structure and which is provided with an end construction for engagement with a nut to prevent the latter from turning, and thereby becoming loose.

The invention is illustrated in the accompanying drawings, in which—

Figure 1:
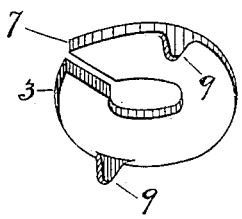
Figure 2:
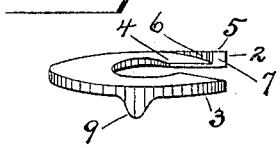
Figure 3:
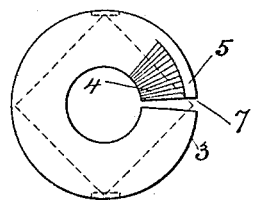
Figure 4:
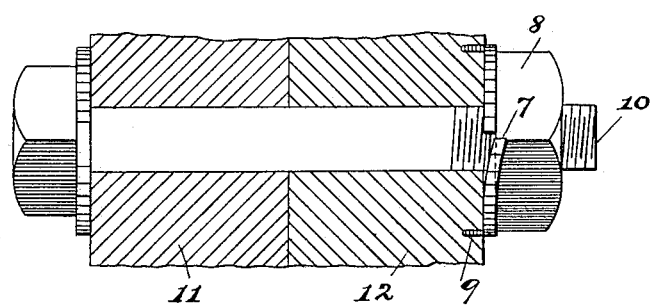

Figure 1 illustrates a perspective bottom view of the device. Fig. 2 is a perspective top view of same; Fig. 3, a plan view of same, showing in broken lines the position of the nut when locked; Fig. 4, a sectional view of two pieces of timber bolted together and the nut locked with the improved device.

Referring to the drawings, the split-ring washer has one end, 2, thereof gradually sprung or bent upward and the other end, 3, slightly bent downward. The upwardly-bent end 2, adjoining the inner circular opening, has an upper surface 4, which inclines or tapers in a curved direction as it recedes from the split or cross-slit, and the outer rim of said upward-bent end 2 is provided with a flange 5, whose inner wall 6 is at right angles to said inclined or tapered surface 4, and the extremity of this flange 5 forms a stop-shoulder 7, which contacts with one of the flat sides 8 of the nut and prevents the latter from accidentally turning backward or working loose, as will be understood. The circumferential or outer edge of the split-ring washer is also provided at diametrically opposite sides with downwardly-projecting tangs or flanges 9, which are adapted to penetrate or be pressed into the timber or wood structure as the nut is screwed onto the bolt 10.

In practice the two pieces of timber 11 12 are placed together and the bolt 10 inserted in a hole previously bored to receive it. The split-ring washer is then slipped over the end of the bolt, with the penetrating-flanges 9 confronting the timber. The nut is then screwed or turned on the end of the bolt, and the bottom surface of the corners of the nut will ride over the top of the upward-bent rim-flange 5 on the end 2 and compress or spring the latter until the corner of the nut passes over its extremity 7. As the nut is turned the oppositely-bent ends 2 and 3 of the split washer are gradually sprung or pressed toward each other, and at the same time the tangs or flanges 9 will be pressed into the timber. After each corner of the nut has passed over the extreme end of the rim-flange 5 the latter will spring up, and the said extremity or stop-shoulder 7 will take against the flat side 8 of the nut and hold the latter rigidly from backward movement, while the tangs hold the split washer from movement.

Having thus fully described my invention, what I claim as new, and desire to secure by Letters Patent, is—

The herein-described nut-lock consisting of a washer having a central opening and a slot extending from the central opening in a direct line to the outer edge and also having a locking-shoulder which extends in a direction parallel with said central opening and which has position between the outer edge of the washer and said central opening, said washer also having a plurality of downwardly-projecting cutting-flanges which are located at the outer edge of the washer and at a greater distance from the central opening than the locking-shoulder, said cutting-flanges having a position on the circumferential edge of the washer at right angles to the said slot and locking-shoulder.

In testimony whereof I affix my signature in the presence of two witnesses.

HENRY J. BERKLEY

Witnesses:
 CHARLES B. MANN, Jr.,
 G. FERDINAND VOGT.